United States Patent

Kitahara et al.

[11] Patent Number: 6,052,079
[45] Date of Patent: Apr. 18, 2000

[54] VEHICLE WITH MILLIMETER-WAVE RADAR

[75] Inventors: Yasuo Kitahara, Hiratsuka; Kunihiro Yamasaki, Isehara; Taku Murakami, Yamato, all of Japan

[73] Assignee: Komatsu Ltd., Tokyo, Japan

[21] Appl. No.: 09/117,522

[22] PCT Filed: Jan. 29, 1997

[86] PCT No.: PCT/JP97/00206

§ 371 Date: Jul. 30, 1998

§ 102(e) Date: Jul. 30, 1998

[87] PCT Pub. No.: WO97/28459

PCT Pub. Date: Aug. 7, 1997

[30] Foreign Application Priority Data

Jan. 31, 1996 [JP] Japan .................................. 8/035751

[51] Int. Cl.[7] .................................................. G01S 13/93
[52] U.S. Cl. .................................................. 342/70; 342/71
[58] Field of Search .................................. 342/70, 71, 72

[56] References Cited

U.S. PATENT DOCUMENTS

| | | | |
|---|---|---|---|
| 5,229,941 | 7/1993 | Hattori | 364/424.02 |
| 5,278,563 | 1/1994 | Spiess | 342/44 |
| 5,321,407 | 6/1994 | Kikuchi et al. | 342/70 |
| 5,497,158 | 3/1996 | Schmid et al. | 342/90 |
| 5,541,590 | 7/1996 | Nishio | 340/903 |
| 5,587,929 | 12/1996 | League et al. | 364/516 |
| 5,638,281 | 6/1997 | Wang | 364/461 |
| 5,717,390 | 2/1998 | Hasselbring | 340/933 |
| 5,966,092 | 10/1999 | Wagner et al. | 342/70 |
| 5,986,601 | 11/1999 | Sugimoto | 342/70 |
| 5,995,037 | 11/1999 | Matsuda et al. | 342/71 |

FOREIGN PATENT DOCUMENTS

| | | |
|---|---|---|
| 636900A2 | 2/1995 | Germany ............ G01S 13/92 |
| 61-70618 | 4/1986 | Japan . |
| 3-255253 | 11/1991 | Japan . |
| 6-160517 | 6/1994 | Japan . |
| 8-75848 | 3/1996 | Japan . |

*Primary Examiner*—John B. Sotomayor
*Attorney, Agent, or Firm*—Sidley & Austin

[57] ABSTRACT

The present invention relates to a vehicle with a millimeter-wave radar capable of accurately detecting stationary objects around the vehicle while positively accepting ground clutter. Accordingly, the vehicle is provided with a millimeter-wave transmitting/receiving antenna (2F) fixed thereto with the center (C) of an antenna beam directed to a road surface (5), and a discrimination element (6) for classifying detected objects (4) by discriminating between objects (4a) the distance (L) to which varies with a movement of the vehicle and objects (4b) the distance (L) to which does not vary with a movement of the vehicle.

22 Claims, 2 Drawing Sheets

VEHICLE WITH MILLIMETER-WAVE RADAR

TECHNICAL FIELD

The present invention relates to a vehicle with a millimeter-wave radar which detects stationary objects around the vehicle, particularly while positively accepting ground clutter.

BACKGROUND ART

Recently, an attempt to equip a high speed vehicle with a millimeter-wave radar has been made in order to prevent accidents caused by drivers' carelessness or errors of judgment in expressways. This is because the advantages of a millimeter-wave radar described hereinafter are taken notice of. Specifically, a millimeter-wave radar is shorter in wavelength compared with a microwave radar or the like, whereby a transmitting/receiving antenna thereof can be reduced in size (so that a vehicle can be easily loaded with the antenna), the width of an antenna beam can be narrowed (which makes it hard to accept clutter from surrounding objects), and the relative velocity with detected objects by Doppler frequency can be detected with high precision.

As shown in FIG. 4, a conventional vehicle with a millimeter-wave radar 1 is provided with a millimeter-wave transmitting/receiving antenna 2 in a front face of the vehicle 1 at a height h of about 0.7 meters above the ground. The millimeter-wave transmitting/receiving antenna 2 has a center C of an antenna beam directed horizontally or upward ($\beta \geq 0°$, $\beta$ is not shown) and the narrow width of an antenna beam $\theta$ so as not to be affected by reflection on a road surface (hereinafter referred to as ground clutter G). A transmitting wave 3a is transmitted forward from a transmitting antenna 2a and a reflected wave 3b from a vehicle which is operating 100 meters ahead, for example, is received by a receiving antenna 2b, so that a distance L between the vehicle 1 and the vehicle operating ahead and a relative velocity V can be detected. A pulse method, a two frequency CW method, a FM-CW method and the like are known as methods for processing the transmitting wave 3a and the reflected wave 3b in the millimeter-wave radar. In addition, frequency analysis methods such as a filter bank, FFT (first Fourier transform) or the like are used in order to detect more than one object at the same time.

The conventional vehicle with the millimeter-wave radar 1 is required not to be influenced by the ground clutter G as described above. On the contrary, vehicles for construction such as dump trucks, wheel loaders or the like operating in construction sites, mines, quarries, and the like are required to accurately detect stationary objects while positively accepting the ground clutter G as illustrated hereinafter.

For example, there are "forward detection" for detecting the presence and the absence of steep downhill slopes (which correspond to stationary objects), and "backward detection" for detecting a hopper or an edge of a cliff (which corresponds to a stationary object) in order to safely and accurately dump loads (earth and sand, or stones and rocks) in the hopper or below the cliff after backing the vehicle 1.

Courses of vehicles operating on roads in construction sites, mines, quarries, and the like are usually fixed. In such courses, research on fleet operation by more than one unmanned vehicle have been enthusiastically conducted. In fleet operation by unmanned vehicles, each vehicle stores course data which were previously obtained by teaching, or course data are given to each vehicle from the outside by various sorts of communication means each time. However, the aforesaid roads have road surfaces in bad condition so that the slip ratio of wheels or crawlers, for example, changes extremely depending on weather (rain or snow), soil quality or the like. As a result, even if the distance covered by a vehicle or velocity V thereof, or the distance L between the vehicle and identified objects (for example, a straight line, a curve, a vehicle operating ahead, an intersection and the like) are obtained after the rotational speed or the like of a wheel or the like is obtained, these values are inaccurate. Therefore, fleet operation can not be achieved only with the course data. Specifically, in unmanned vehicles, in addition to the aforesaid "forward detection" and "backward detection", "side detection" for detecting the edge of a cliff, some objects and the like (which are stationary objects) to prevent the vehicles from falling below the cliff on a curve is also necessary.

SUMMARY OF THE INVENTION

In consideration of the above-described illustration, an object of the present invention is to provide a vehicle with a millimeter wave radar which accurately detects stationary objects around the vehicle while positively accepting ground clutter.

In a vehicle with a millimeter-wave radar according to the present invention, the vehicle is provided with a millimeter-wave transmitting/receiving antenna with a transmitting antenna thereof transmitting a transmitting wave to the surroundings and a receiving antenna thereof receiving a reflected wave from a surrounding object so as to be able to detect at least a distance between the vehicle and the object, the millimeter-wave transmitting/receiving antenna being set with a center of an antenna beam directed to a road surface, and provided with a discrimination element for classifying detected objects by discriminating between objects the distance to which varies with a movement of the vehicle and objects the distance to which does not vary with a movement of the vehicle.

According to the above-described structure, first, objects for which the distance does not vary are detected as a road surface, that is, ground clutter. When there exist objects which have greater reflection intensity than ground clutter on the road surface, the objects are discriminated from the road surface and detected as the objects for which the distance varies.

Further, the vehicle with the millimeter-wave radar can be provided with a storage element for storing course data of the vehicle in advance and with a first identification element for inputting information on the objects the distance to which varies from the discrimination element, checking the inputted information against the course data, and identifying the objects the distance to which varies as first identified objects.

According to the above-described structure, "the objects for which the distance varies", which are detected by discriminating from the road surface, are identified as objects which are stored in the course data, for example, a downhill slope or a cliff. Therefore, operators or unmanned vehicles can manually or automatically, respectively, take proper action in accordance with the identified information.

Moreover, the vehicle can be provided with an extraction element for inputting information on the objects for which the distance does not vary from the discrimination element, and for extracting changed objects based on the changed information when the information changes.

According to the aforesaid structure, when a road surface (that is, ground clutter), which is detected as an object for which the distance does not vary, changes, a downhill slope or a cliff, for example, are recognizable based on the changed information. Thus, operators can manually take suitable action in accordance with the information from the extraction element (changed objects).

Further, the vehicle can be provided with a storage element for storing course data of the vehicle in advance and with a second identification element for checking information on changed objects which is inputted from the extraction element against the course data, and for identifying the changed objects as second identified objects.

According to the aforesaid structure, the vehicle is provided with the second identification element for identifying changed objects in addition to the extraction element, thereby recognizing the changed objects concretely as a downhill slope, a cliff, or the like after checking the changed objects against the course data. Consequently, operators or unmanned vehicles can manually or automatically, respectively, take proper action in accordance with the concrete information.

DETAILED DESCRIPTION OF THE INVENTION

A preferable embodiment of the present invention will now be described in detail with reference to the attached drawings.

Figure 1:
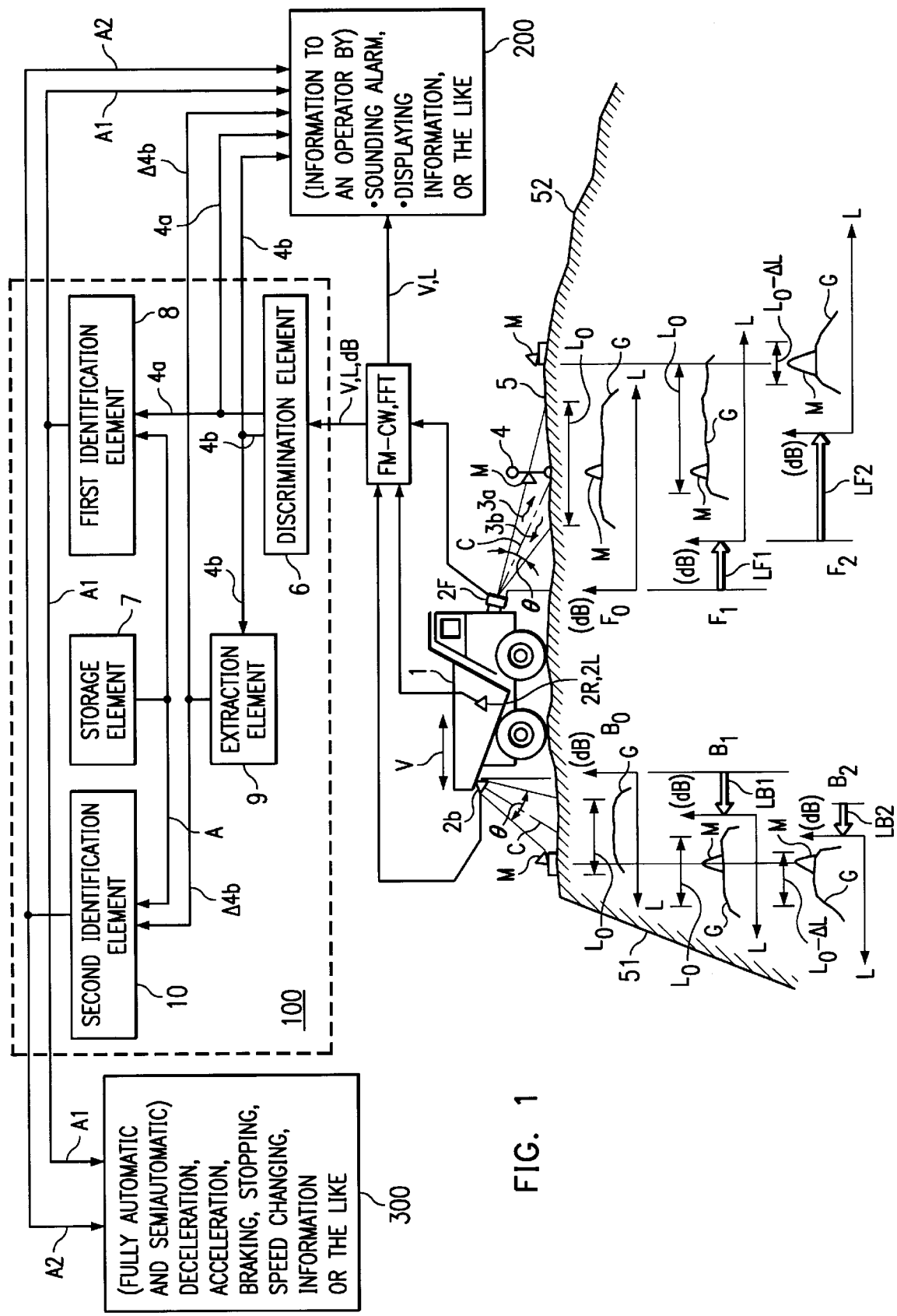
FIG. 1 is an explanatory view of a vehicle with a millimeter-wave radar showing all together the first example to the fifth example according to the present invention.
Figure 2:
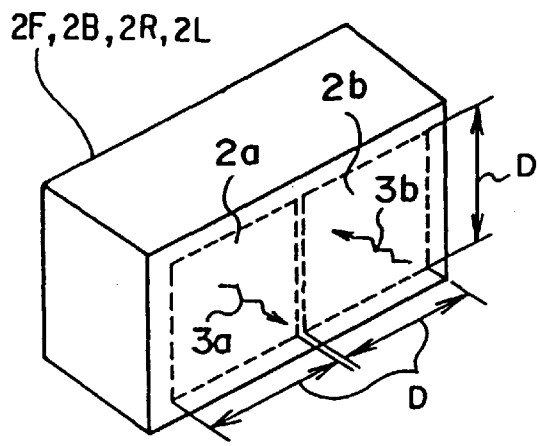
FIG. 2 is a perspective view of a millimeter-wave transmitting/receiving antenna according to the present invention.

As shown in FIG. 1, a vehicle 1 is attached with four millimeter-wave transmitting/receiving antennas 2F, 2B, 2L, and 2R on the front and the rear, and the right and the left thereof at a height of 1.5 to 3 meters above the ground. The attaching position of each of the millimeter-wave transmitting/receiving antennas is as follows: 2F is attached on the front of the vehicle 1, 2B is on the rear thereof, 2L is on the left side thereof, and 2R is on the right side thereof.

Each millimeter-wave transmitting/receiving antenna 2F, 2B, 2L, and 2R has a structure in which a transmitting antenna 2a and a receiving antenna 2b, both of which have a flat shape, are disposed adjacent to each other. The effective length D of both the antenna 2a and the antenna 2b is about 85 millimeters in length and breadth, respectively. A center C of an antenna beam (See FIG. 1.) is fitted with a horizontal angle β being inclined at an angle of minus 6 degrees or less. Incidentally, "minus" of "minus 6 degrees" means that the center is directed downward in relation to the horizontal direction of the vehicle 1, and "minus 6 degrees or less" means the center is directed downward 6 degrees or more in relation to the horizontal direction. Therefore, each receiving antenna 2b receives a reflected wave 3b from each road surface 5 in front of, behind, on the right and the left of the vehicle 1. Specifically, each receiving antenna 2b receives a road surface condition (that is, ground clutter G). By the way, when millimeter-wave transmitting/receiving antennas 2F, 2B, 2L, and 2R are generally explained, they are generally called the millimeter-wave transmitting/receiving antenna 2, instead.

Figure 3:
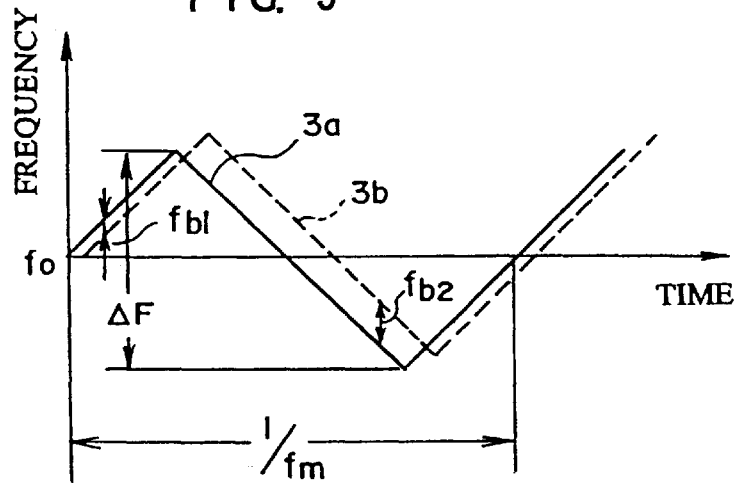
FIG. 3 is an explanatory view of the principle of data processing in a FW-CW method according to the present invention.
Figure 4:
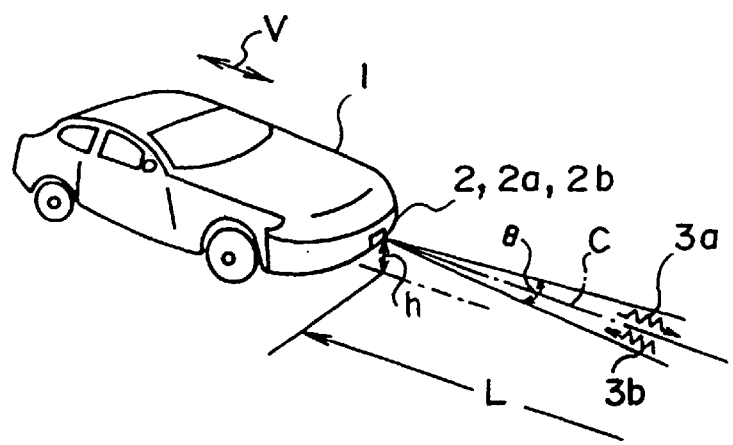
FIG. 4 is a perspective view of a vehicle with a millimeter-wave radar according to prior arts.

Before describing examples, a configuration of a millimeter-wave radar which is equipped with the vehicle 1 is described. A millimeter wave is an electromagnetic wave with a wave length λ of 1 to 10 millimeters (namely, 300 to 30 GHz). In the present examples, a millimeter wave with a wave length of λ≅5 mm (59.5 GHz) is used and frequency analysis by FFT is conducted under a FM-CW method. By means of the FM-CW method, as shown in FIG. 3, a millimeter wave (a carrier wave) is modulated with a signal wave (a chopping wave in the present examples), and a transmitting wave 3a and a reflected wave 3b are mixed to obtain beat frequency fb1 and fb2. Thereafter a distance L between the vehicle 1 and an object 4 and relative velocity V are calculable with the following general equations (1) and (2).

$$L = C \cdot (fb2 + fb1)/(8\Delta F \cdot fm) \quad (1)$$

$$V = C \cdot (fb2 - fb1)/4fo \quad (2)$$

In the above equations, C represents the velocity of light, fb1 represents "beat frequency in an increase side" shown in FIG. 3, fb2 represents "beat frequency in a decrease side" shown in FIG. 3, ΔF represents deviation range of frequency (75 MHz in the examples), fm represents frequency of the aforesaid chopping wave (781.25 kHz in the examples), and fo represents center frequency which is the frequency of the aforesaid millimeter-wave (59.5 GHz).

Incidentally, FIG. 3 is an explanatory view in which the object 4 is single. However, in the present examples, FFT is adopted to detect more than one object 4. In other words, the reflected wave 3b has different receive intensity (dB) depending on the distance L to the objects 4, the direction to the objects (angle formed between the center C of the antenna beam and the direction of the object 4 which is seen from the millimeter-wave transmitting/receiving antenna 2), effective reflection area of the object 4, and the like. In FFT, the above-described difference in receive intensity (dB) is taken notice of, and the predetermined threshold value is set in the receive intensity (dB), thereby obtaining beat frequency of receive intensity (dB) which is larger than the threshold value. If a threshold value is set as described above, plural receive intensities (dB) can be obtained. Specifically, when the object 4 is single, a pulse peak value can be obtained, and when the object 4 is continuum like a road surface 5, a continuous peak value covering the whole range of the width θ of the antenna beam is obtained. The aforesaid width θ of the antenna beam is shown in the following general equation (3). θ is an angle at which antenna gain is a half (½) of the antenna gain in the center C of the antenna beam which is the maximum, thus showing effective spreading range of electric wave. In the embodiments, θ≅70·4° (that is, 2° up and down, to the right and the left, respectively).

$$\theta \cong 70 \cdot \lambda/D \quad (3)$$

Distance resolution ΔL relative to a detected object by an electric wave radar is given by the following general equation (4), and ΔL=2 m (that is, ±1 m in front and behind) is obtained in the present examples.

$$\Delta L = C/2\Delta F \quad (4)$$

In the examples shown in FIG. 1, in the vehicle 1 with a millimeter-wave radar with the aforesaid configuration, a controller 100 which is composed of a microcomputer and the like is connected to the millimeter-wave radar. The controller 100 includes:

i) a discrimination element 6 for classifying more than one detected object 4 by discriminating between objects 4a the distance L to which varies with a movement of the vehicle 1 and objects 4b the distance L to which does not vary with a movement of the vehicle 1;

ii) a storage element 7 for storing course data A of the vehicle 1 in advance;

iii) A first identification element 8 for receiving information on the objects 4a from the discrimination element 6, for checking the objects 4a against the course data A which is stored in the storage element 7, and for identifying the objects 4a as identified objects A1 (first identified objects A1);

iv) an extraction element 9 for receiving information on the objects 4b from the discrimination element 6, and for extracting changed objects Δ4b when the information changes; and v) a second identification element 10 for receiving information on the changed objects Δ4b from the extraction element 9, for checking the changed objects Δ4b against the course data A which is stored in the storage element 7, and for identifying the changed objects Δ4b as identified objects A2 (second identified objects A2).

When the vehicle 1 is a manned vehicle, the controller 100 is connected to an alarm unit or an indicator 200 which are equipped in a driver's cab and the like. The indicator 200 gives an alarm to a driver and the like, or indicates the presence or the absence of the objects 4, the distance L, relative velocity, a concrete name of the object, and the like based on input from the controller 100. Meanwhile, when the vehicle 1 is an unmanned vehicle, the controller 100 is connected to a control element 300 which automatically controls an engine, a governor, a brake, a steering, a transmission, an alarm unit, communication with the outside or the like. The control element 300 stores the predetermined program in advance, and conducts the above-described automatic control according to the predetermined program and input from the controller 100. As illustrated in FIG. 1, assuming that the vehicle 1 moves forward and backward on the road surface 5 between a rear cliff 51 and a downhill slope 52 in front, concrete examples will be described below.

The first example will be described. Assuming that the vehicle 1 is moving forward, the position of the millimeter-wave transmitting/receiving antenna 2F of the vehicle 1 in the state shown in FIG. 1 is represented by F0, the position where the vehicle 1 moves forward from the position F0 by a distance LF1 is represented by F1, and the position where the vehicle 1 moves farther forward from the position F1 by a distance LF2 is represented by F2. FIG. 1 also shows the results detected by the millimeter-wave transmitting/receiving antenna 2F in each of the positions F0, F1, and F2, and the vertical axis is the receive intensity (dB), and the horizontal axis is the distance L, respectively. When the whole transmitting wave 3a with the width θ of the antenna beam is directed to the road surface 5, it can be detected that the ground clutter G is the road surface 5, since even if the vehicle 1 moves, the ground clutter G occurs through the whole width θ of the antenna beam and the distance L0 of the detected ground clutter C does not vary as shown in the detected results of the positions F0 and F1. Accordingly, the road surface 5 is the object 4b.

In the position F2 where the vehicle 1 moves farther forward, the ground clutter G disappears around the point where the downhill slope 52 starts, as shown in the detected results. Specifically, the distance of the ground clutter G in the position F2 varies from L0 to "L0−ΔL" by "−ΔL", whereby the change of the ground clutter G which is the object 4b is extracted so that the presence of the downhill slope 52 is recognized.

When there exists the object 4 within the width θ of the antenna beam as illustrated in FIG. 1, receive intensity which exceeds the ground clutter G can be obtained from the object 4 depending on conditions. However, as shown in the detected results of the positions F0 and F1, unless the object 4 carries a reflector M with it, it is difficult to discriminate between the object 4 and the ground clutter G. Hence, it is supposed that the object 4 in this example carries the reflector M. The reflector M can give the reflected wave 3b with larger receive intensity (dB) than the ground clutter G to the receiving antenna 2b depending on the setting of the number of reflectors, effective area, or the like. This is because the receive intensity (dB) of the ground clutter G is almost proportional to the horizontal angle β of the millimeter-wave transmitting/receiving antenna 2F, but does not exceed the receive intensity (dB) from the reflector M. As a result, when the vehicle 1 moves forward from the position F0 to the position F1, the distance L between the vehicle 1 and the reflector M varies as shown in the detected results in the positions F0 and F1 so that the presence of the object 4 which carries the reflector can be confirmed. Accordingly, the reflector M is the object 4a.

The reflector M is fixed in the vicinity of the point where the downhill slope 52 starts. When the vehicle 1 moves farther forward by the distance LF2, the starting point of the downhill slope 52 can be detected with precision by the reflector M as shown in the detected results in the position F2. However, distance detection accuracy (that is, distance resolution) ΔL never exceeds the high accuracy of ±1 m. Incidentally, as described above, in the millimeter-wave radar in this example, the center C of the antenna beam with a horizontal angle of −6° or less, and the width θ of the antenna beam is ±2° in relation to the center C of the antenna beam. This is because it is taken into consideration that the millimeter-wave radar in this example is not influenced by the ground clutter G up to 4 degrees downward. Therefore, if there exists the ground clutter G when the vehicle 1 approaches immediately in front of the starting point of the downhill slope 52, it can be confirmed that the downhill slope 52 is inclined within the attaching horizontal angle β of the millimeter-wave transmitting/receiving antenna 2F.

The second example will now be described. The above-described first example shows the detection of the downhill slope 52 in a forward movement, while this example shows an example of the detection of a cliff 51 in a backward movement of the vehicle 1. FIG. 1 also illustrates data detected by the millimeter-wave transmitting/receiving antenna 2B which is fitted on the rear of the vehicle 1: i) in a position B0 in the state shown in FIG. 1; ii) in a position B1 where the vehicle 1 moves backward from the position B0 by the distance LB1; and iii) in a position B2 where the vehicle 1 moves backward from the position B1 by the distance LB2. In the detected data, just like the first embodiment, the vertical axis is the receive intensity (dB), and the horizontal axis is the distance L. According to this second example, with the detection in the same way as the first example, the presence of the cliff 51 which corresponds to the object 4b and the presence of the reflector M (which corresponds to the object 4a) which is disposed in the vicinity of the edge of the cliff 51 are confirmed.

The third example will now be described. This is an example of the detection by means of the millimeter-wave transmitting/receiving antennas 2L and 2R on the left and the right, respectively, shown in FIG. 1. According to this example, the cliff 51 and the conditions of a shoulder of a road including a reflector M and the like can be detected.

As is described above, if the vehicle 1 is provided with the discrimination element 6, or both the discrimination element 6 and the extraction element 9 as shown in in FIG. 1, the above-described first, second and third examples can be attained.

The fourth example will now be described. When being used in fleet operation, the vehicle 1 needs to previously store, for example, the course data A in the storage element 7. Moreover, the vehicle 1 is provided with the first identification element 8 for receiving the information on the objects 4a from the discrimination element 6, checking the objects 4a and the course data A in the storage element 7, and identifying the objects 4. With this checking, the objects 4a are identified as the identified objects A1 such as the cliff 51, the downhill slope 52, a corner, and an intersection.

More specifically, the detectable reflectors M (namely, the objects 4a) are set not only for confirming the starting point of the downhill slope 52, the vicinity of the edge of the cliff 51 or the like, but also on a curve and an intersection, and at the start of, on the way of, and at the end of the a straight road. Besides, the significance of each reflector M in addition to the setting positions is stored in the course data A. Thus, the first identification element 8 checks the detected reflector M and the course data A in the storage element 7, signifies that the reflector M is, for example, the identified object A1 which is "a downhill slope", and inputs the signified identified object A1 to the control element 300. The control element 300 makes the vehicle 1 operate by fleet based on this input. Incidentally, when the vehicle 1 is a manned vehicle, the detected results (the identified objects A1) in the first identification element 8 can be inputted in the indicator 200 or the like.

The fifth example will now be described. As is evident from the aforesaid first, second and third examples, the presence of the downhill slope 52 or the cliff 51 can be nearly confirmed by the presence of the changed objects Δ4b from the extraction element 9, even if there are no reflectors M (namely, the objects 4a). Specifically, information on the changed objects Δ4b from the extraction element 9 is checked with the course data A which is stored in the storage element 7 in the same way as the fourth example, and the changed objects Δ4b are identified as the identified objects A2, for example, "a downhill slope" or "a cliff". This identification is conducted in the second identification element 10 which is shown in FIG. 1. The identified results, that is, the identified objects A2 are inputted in the control element 300 in the same way as the fourth example. According to this example, fleet operation of the vehicle 1 is also possible. When the vehicle 1 is a manned vehicle, the identified results can be also inputted in the indicator 200 or the like.

As described above, FIG. 1 illustrates all together the first example to the fifth example. In order to obtain just enough operation effects which are described in the above examples, the vehicle 1 is required to have at least any one of only the discrimination element 6 (the first combination), the discrimination element 6, the storage element 7, and the first identification element 8 (the second combination), the discrimination element 6 and the extraction element 9 (the third combination), and the discrimination element 6, the storage element 7, the extraction element 9, and the second identification element 10 (the fourth combination). Needless to say, the vehicle 1 can have all of the aforesaid elements. In the present invention, the vehicle 1 with the millimeter-wave radar is capable of accurately detecting stationary objects around the vehicle 1 while positively accepting the ground clutter G.

It should be mentioned that the transmitting antenna 2a and the receiving antenna 2b which are used in each of the aforesaid examples have respectively a flat shape with the antenna effective length D of about 85 millimeters in length and breadth, respectively. However, when the width of detection in the forward, backward, right and left direction of the road surface 5 needs to be widened (in other words, when the width θ of the antenna beam needs to be widened), the millimeter-wave transmitting/receiving antenna 2 can also scan forward, backward, right, and left. In addition, as is clear from the aforesaid general equation (3), the millimeter-wave transmitting/receiving antenna 2 can be reduced in size (in other words, the antenna effective length D is shortened), and the wave length λ can be lengthened.

As will be appreciated by one skilled in the art, the present invention is useful for a vehicle with a millimeter-wave radar capable of accurately detecting stationary objects around the vehicle while positively accepting ground clutter.

What is claimed is:

1. A vehicle with a radar for detecting a distance between the vehicle and an object, comprising:

a radar fixed to the vehicle, said radar including a transmitting/receiving antenna;

a discrimination element for classifying objects detected by the radar between first and second types of objects, said first type of objects being objects whose distance from the vehicle varies with a movement of the vehicle, said second type of objects being objects whose distance from the vehicle does not vary with a movement of the vehicle;

a storage element for storing course data of the vehicle, said course data including object information; and a first identification element for receiving information on a object of the first type detected by the radar and for comparing the received information with the stored course data;

said first identification element discriminating whether the received information corresponds to the object information included in said course data, said first identification element identifying said object of the first type detected by the radar in the case where it is discriminated that the received information does correspond to the object information included in said course data.

2. A vehicle with a radar in accordance with claim 1, wherein said radar is a millimeter wave radar.

3. A vehicle with a radar in accordance with claim 2, wherein said radar is equipped with a plurality of transmitting/receiving antennas.

4. A vehicle with a radar in accordance with claim 3, wherein at least one of said plurality of transmitting/receiving antennas is mounted on each of a front, a rear, a left, and a right portion of said vehicle.

5. A vehicle with a radar in accordance with claim 1, wherein said radar fixed to the vehicle is directed to a road surface.

6. A vehicle with a radar in accordance with claim 5, wherein a center of an antenna beam is inclined at an angle between 0 and −6 degrees in relation to a horizontal direction of the vehicle.

7. A vehicle with a radar in accordance with claim 5, wherein said object information included in said course data corresponds to at least one of a hopper, a cliff, a shoulder of a road, a corner, an intersection, an uphill slope, and a downhill slope.

8. A vehicle with a radar in accordance with claim 1, wherein said second type of objects include ground clutter detected by said radar.

9. A vehicle with a radar in accordance with claim 1, further comprising a control element which controls at least one of an engine, a governor, a brake, and a steering of the vehicle in accordance with a stored program.

10. A vehicle with a radar for detecting a distance between the vehicle and objects comprising:
 a radar fixed to said vehicle for detecting objects as said vehicle moves;
 a discrimination element for classifying objects detected by said radar, said discrimination element discriminating between first and second types of objects, said first type of objects being objects whose distance from the vehicle varies with a movement of the vehicle, said second type of objects being objects whose distance from the vehicle does not vary with a movement of the vehicle; and
 an extraction element for receiving information from said discrimination element associated with detected objects of the second type to detect a change in said received information.

11. A vehicle equipped with a radar in accordance with claim 10, further comprising:
 a storage element for storing course data for said vehicle, said course data including object information; and
 a second identification element for receiving information on said detected change from said extraction element and for comparing said information on said detected change against the course data to identify objects which correspond to said detected change.

12. A vehicle equipped with a radar in accordance with claim 10, wherein said radar is a millimeter-wave radar.

13. A vehicle equipped with a radar in accordance with claim 12, wherein a center of an antenna beam of the millimeter-wave transmitting/receiving antenna directed to a road surface.

14. A vehicle with a radar for detecting a distance between the vehicle and an object, comprising:
 a radar fixed to the vehicle, said radar including a transmitting/receiving antenna;
 a discrimination element for classifying objects detected by the radar between first and second types of objects, said first type of objects being objects whose distance from the vehicle varies with a movement of the vehicle, said second type of objects being objects whose distance from the vehicle does not vary with a movement of the vehicle;
 a storage element for storing course data of the vehicle, said course data including object information;
 a first identification element for receiving information on a object of the first type detected by the radar and for comparing the received information with the stored course data;
 said first identification element discriminating whether the received information corresponds to the object information included in said course data, said first identification element identifying said object of the first type detected by the radar in the case where it is discriminated that the received information does correspond to the object information included in said course data;
 an extraction element for receiving information from said discrimination element associated with detected objects of the second type to detect a change in said received information;
 a second identification element for receiving information on said detected change from said extraction element and for comparing said information on said detected change against the course data to identify objects which correspond to said detected change.

15. A vehicle equipped with a radar in accordance with claim 14, wherein a center of an antenna beam is inclined at an angle between 0 and −6 degrees in relation to a horizontal direction of the vehicle.

16. A vehicle equipped with a radar in accordance with claim 14, said radar is equipped with a plurality of transmitting/receiving antennas.

17. A vehicle with a radar for detecting a distance between said vehicle and objects comprising:
 a radar, fixed to said vehicle, for detecting objects as said vehicle moves, said radar positioned for a center of a beam of said radar to be directed to a road surface; and
 a discrimination element for classifying said objects detected by said radar, said discrimination element discriminating between first and second types of objects, said first type of objects being stationary objects whose distance from said vehicle varies with a movement of said vehicle, said second type of objects being ground clutter objects whose distance from said vehicle does not vary with a movement of said vehicle.

18. A vehicle with a radar in accordance with claim 17, wherein said radar is a millimeter-wave radar.

19. A vehicle with a radar in accordance with claim 17, wherein said vehicle is equipped with a plurality of radar antennas.

20. A vehicle with a radar in accordance with claim 19, wherein at least one of said plurality of transmitting/receiving antennas is mounted on each of a front, a rear, a left, and a right portion of said vehicle.

21. A vehicle with a radar in accordance with claim 17, wherein said center of said beam is inclined at an angle between approximately 0 and approximately −6 degrees in relation to a horizontal direction of said vehicle.

22. A vehicle with a radar in accordance with claim 17, further comprising a control element that controls at least one of an engine, a governor, a brake, and a steering of said vehicle in accordance with a stored program.

* * * * *